3,312,653
SOLUTION OF THE REACTION PRODUCT OF A LINEAR POLYCARBONATE, AN ORGANIC DI-ISOCYANATE AND WATER

Henry A. Pace, Akron, Ohio, assignor to The Goodyear Tire & Rubber Company, Akron, Ohio, a corporation of Ohio
No Drawing. Filed Nov. 9, 1964, Ser. No. 410,003
5 Claims. (Cl. 260—30.8)

The present invention relates to the provision of novel useful resilient, cellular synthetic foams. More particularly, it relates to resilient, cellular foams prepared by the reaction of a linear hydroxyl terminated polycarbonate and an organic diisocyanate under foam inducing conditions, and to the solutions thereof.

Resilient, cellular synthetic foams find wide utility, for example, as mattresses, pillows, chair pads, rug pads, etc. Although many different elastic cellular foams have been provided for such uses, heretofore certain reservations have been attached to their use, either because they are too costly or because their resiliency or other physical properties leave something to be desired. This applies both to synthetic foams as well as those prepared from natural rubbers.

Also, it is desirable to have cured solutions of the polyurethane carbonates which may be laid down as films and castings that do not need to be cured after the removal of the solvent. In addition these polyurethane carbonate solutions can be used to extrude threads having improved resistance to discoloration.

According to the present invention, a resilient, cellular synthetic foam has been provided which has unusually desirable physical properties, particularly with respect to resiliency. In addition, these contemplated foams may be prepared from less expensive materials.

Thus, a resilient, cellular foam comprising the reaction product of a linear hydroxyl terminated polycarbonate and an organic diisocyanate in which the foaming is induced by the presence of a small quantity of water, has been provided by the present invention. Such foam is soft to the touch, contains an essentially uniform cellular structure, and is elastic. They are quite strong withstanding substantial compression or tension without crumbling or otherwise disintegrating and are water insoluble. They possess good fire-resistance properties.

When prepared in accordance with a suitable technique, the cellular structure of the foam is essentially uniform comprising small communicating and/or non-communicating cells.

When prepared in accordance with a suitable technique, the cellular structure of the foam is essentially uniform comprising small communicating and/or non-communicating cells. As a consequence, the foams are not only elastic, but are absorptive, and when immersed in inert liquid media, will act as a sponge. They are relatively light, having a density of from 2 to 6 pounds per cubic foot. Under compression, a typical contemplated foam may be compressed to between one-twentieth and one-half its volume.

The density of the foams can be varied by the use of auxiliary blowing agents such as the chlorinated and halogenated hydrocarbons. Representative blowing agents are those boiling below about 110° C. and illustrative compounds are propane, butane, pentane, the ethers, methylene chloride, dichlorofluoromethane.

Foams having the afore-enumerated unique combination of properties are prepared by recourse to any of several procedures by which a linear hydroxyl terminated polycarbonate is suitably reacted with an organic diisocyanate, such as 2,4-toluene diisocyanate, in the presence of a small amount of water which induces the foaming action. Apparently, during the course of the interreaction between the two organic components, the water or other foaming agent reacts with an isocyanate radical present evolving carbon dioxide, the foaming agent.

For the most part, the resilieint and elastic property of the contemplated foams are achieved by effecting the desired reaction between the linear hydroxyl terminated polycarbonate and the organic diisocyanate in the presence of a foam inducing agent to provide rigidity. Thus, linear hydroxyl terminated polycarbonates which are free from aromatic nuclei are preferred. Likewise, the absence of components such as phthalic anhydride or the corresponding acid is recommended in this regard. Compounds which possess three or more reactive hydrogen such as the trihydric alcohols typified by glycerol and the tribasic acid esters such as citric acid esters should be excluded, except where rigid foams are desired.

Of course, at the expense of resiliency, elasticity, and softness it is possible to incorporate minor quantities of these materials. However, usually not more than about 3 percent by weight of the polycarbonate and diisocyanate is employed in any event.

Linear polycarbonates having molecular weights ranging from between 800 and 5000, more notably between 1600 and 3000, hydroxyl numbers of from about 20 to about 100 and containing terminal hydroxyl groups to the essential exclusion of other terminal groups are employed. Such polycarbonates have the following general structure:

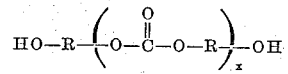

wherein R represents a residue of a saturated, acyclic (aliphatic) diol and X designates the number of repeating units of the molecule. Depending on the particular diol from which R is derived, X may vary, but generally is a whole integer from 5 to 50. With diethylene glycol as the source of R, X is suitably from 12 to 20.

The hydroxyl terminated polycarbonates of the above formula are prepared by the reaction of a suitable glycol with the bis chloroformate of the desired glycol. Specific details of their preparation is described hereinafter in Procedures A and B.

Other mixed polycarbonates derived from two or more acyclic, saturated diols may be employed in accordance with the principles of the present invention.

Aromatic diisocyanates in which the diisocyanates are nuclear substituents such as 2,4-toluene diisocyanate and 2,6-toluene diisocyanate, and mixtures of the two comprise a favored class of diisocyanates in the performance of the present invention. Apparently, for the purposes of providing the herein contemplated foam, the aromatically substituted diisocyanates permit preparation of the foam with a minimum of difficulties. Other aromatic isocyanates include para-phenylene diisocyanate, 1,5-naphthalene diisocyanate, tolidine diisocyanate, 3,3¹-dimethyl, 4,4¹-biphenyl diisocyanate and 3,3¹-dimethoxy-4,4-biphenylene diisocyanate as well as corresponding diisocyanates in which the aromatic nucleus is further substituted with halogens, notably chlorine such as 2-chloroparaphenylene diisocyanate and particularly lower alkyl groups containing usually up to 5 carbon atoms such as methyl, ethyl, isopropyl, butyl, etc. nuclear substituents. Inert nuclear substituents such as $NO_2$— may also be present. Other organic diisocyanates may be employed to provide foams.

In practice, the foam is generated according to one procedure by mixing a linear hydroxyl terminated polycarbonate and appropriate organic diisocyanates, such as 2,4-toluene diisocyanate, and effecting some interreaction until a more viscous system results, e.g. until an extended polymer is formed. Depending to a great extent upon the reagents and their reactivity, this may take from several seconds to an hour, but ideally consumes several minutes under vigorous agitation. After the reaction medium, due to interreaction of the two reagents, is suitably viscous to entrap the foaming agent, a small quantity of water is added which by virtue of its reactivity with isocyanate groups present in the viscous medium liberates $CO_2$. Upon transferring to and standing in a suitable mold, foaming takes place with the observable rise occurring in a matter of from several seconds up to 10 minutes and a cellular foam is generated.

It is also possible to facilitate the foam manufacture by incorporating in the material mixture, a catalytic quantity of triethylamine or like amine containing no active amino hydrogen. Tertiary amines, including other trialkylamines, N-methyl morpholine, and pyridine may be used. Usually between 0.05 and 2.5 percent trimethylamine by weight of the linear hydroxyl terminated polycarbonate suffices to impart the catalyzing effect. Somewhat larger concentrations of catalysts are possible, but care is usually exercised to avoid unduly rapid foaming.

It will be appreciated that the exact ratio of hydroxyl terminated polycarbonate and organic isocyanate utilized in connection with the generation of the herein contemplated foams may be widely varied. If between 1 and 6 moles of organic diisocyanate per mole of linear polycarbonate is employed, high quality foams may be prepared. Using a somewhat more restricted quantity of organic isocyanates, such as between 1 to 3 moles thereof per mole of linear polycarbonate, provides the best foam.

For the most part, the described foaming procedure is accomplished without recourse to temperatures other than atmospheric. However, the overall foaming reaction apparently is exothermic and in large scale operation, it may be desirable to make provision for removing some of the generated heat and maintaining as nearly as possible, uniform temperatures throughout the foaming mixture. Temperatures as high as 100° C. may be tolerated.

Subsequent to generation, the foam may be further processed to enhance its properties or otherwise make it more suitable for commercial use. Thus, the foam may be post-cured by subjecting it to temperatures in the general range of 60° C. to 150° C. The foam may also be boiled in water.

Other procedures for bringing the reagents into foam producing relationship are available. Thus, the linear hydroxyl terminated polycarbonate and catalyst, if desired, along with a portion but not all of the organic diisocyanate, may be reacted to provide an intermediate linear reaction polymer which is more viscous than the initial mixture of reagents. Thereafter, additional isocyanate is added and with good agitation, foaming may be induced by incorporating a small quantity of water, or other foam inducing agent into the mixed media.

It is also possible to provide foams by adding an organic diisocyanate such as 2,4-toluene diisocyanate to a mixture containing the linear hydroxyl terminated polycarbonate, the appropriate quantity of water, and when desired, the catalyst. In this procedure, violent agitation during and subsequent to the addition of the organic diisocyanate is quite important. Also, it has been found advisable to incorporate an emulsifier such as alkyl aryl polyether alcohols, polyoxyethylene sorbitan trioliate and the sodium salt of N-methyl-N-palmitoyl taurate to the mixture prior to adding of the isocyanate.

Water is the preferred foam inducing agent, and may be suitably introduced in various forms other than by mere addition of water. Steam, for example, may be admixed or passed into the reaction medium. Salts containing easily freed water of crystallization may be used to provide the water for inducing foam. Water solutions of glycols and alkylol amines, e.g. ethylene glycol, butylene glycol, 1,4-butane diol and monodiethanolamine. Small amounts, usually from 0.05 to 5.0 percent of foam inducing agent or agents by weight of the reactants are used to impart the desired result.

The polyurethane polycarbonate foams (or another designation for these is polyureaurethane polycarbonates) can be dissolved in a suitable solvent such as a dialkyl amide or a dialkyl sulfoxide where the alkyl radicals have from 1 to 10 carbon atoms and higher to form solutions useful for making coatings, film, thread, etc. These solutions are formed by allowing the foam to stand in contact with the solvent either at ambient or elevated temperature with temperatures of about 20 to 100° C. normally being used and the preferred temperature being about 30 to 80° C. An amine catalyst such as di-N-butylamine is particularly useful with the dialkyl formamides to aid in the formation of the solution of the foam.

Contemplated linear hydroxyl terminated polycarbonates may be prepared by the following illustrative procedures:

PROCEDURE A

Into a suitable reaction, a mixture including an inert organic solvent such as ethylene dichloride, a bis-chloroformate of a diol, e.g. diethylene glycol, and a diol such as diethylene glycol are charged. Between 1.0 and 2.0 moles of bis-chloroformate per mole of glycol are employed. With temperatures of between 0° C. and 30° C., an aqueous solution of concentrated sodium hydroxide (e.g. 50 percent NaOH) is injected into the mixture, until a total of about 3 to 5 moles of NaOH per mole of bis-chloroformate is so added. Good agitation of the mixture accompanies the addition and is continued for some 2 to 3 hours thereafter.

The resulting system is phase separated and the organic layer, if necessary, may be filtered whereafter the inert solvent is removed by vacuum distillation at temperatures below 125° C. The hydroxyl terminated polycarbonate remains as the bottom.

PROCEDURE B

Using a mixture of between 1.05 and 1.15 moles of an acyclic diol such as diethylene glycol per mole of a carbonate diester, e.g. diethyl carbonate, an ester interchange or alcoholysis type of reaction is conducted to provide a contemplated linear polycarbonate. A catalyst, for example, metallic sodium in concentrations on the order of 0.005 percent by weight of the mixture is used.

The reaction is effected by applying heat, usually to gradually elevate the temperature up to as high as about 200° C. Throughout the reaction, the evolved ethyl alcohol is withdrawn from the system by gradual application of a vacuum thereto as the reaction progresses. The mole ratio of reactants is maintained essentially constant throughout by returning any reactants which may accompany the removed ethyl alcohol by selective condensation.

After concluding the reaction, the product containing reaction mixture is subjected to vacuum topping to remove unreacted reagents. Maximum temperatures between 150° C. and 200° C. are used in this step.

The following examples illustrate the preparation of elastic foams according to the principles of this invention:

*Example 1*

Into a glass reactor was charged a 100 parts of a linear polycarbonate having a hydroxyl number of 55 prepared by the reaction of a phosgenated diethylene glycol with an excess of diethylene glycol. The polycarbonate was adjusted to 25° C. and then 9.6 parts of toluene diisocyanate was added with stirring. After about 3 minutes 18 parts more of toluene diisocyanate was added. Three minutes later about 1 part of the condensation product of butyraldehyde and aniline was added to the reactor and a few minutes later 1.8 parts of water was added to be followed by the addition of about 0.8 part of N-methyl morpholine. The resulting mixture was poured into glass beakers and placed in a 60°–80° C. oven to foam and cure overnight. The foam had a density of 4.4 pounds per cubic foot, with medium size cells and a good soft hand. The foam was free of cracks and fissures and on stretching had good snap.

Example 2

A foam was made by forming a prepolymer and then adding water to the prepolymer to induce foaming. The formulation used in this recipe was 100 parts of a polyglycol carbonate ester having a hydroxyl number of 77.5 and a secondary hydroxyls
30 parts toluene diisocynate
1.83 parts water
0.85 part castor oil
0.5 part N-methyl morpholine This foam was very coarse and heterogeneous and had a sluggish recovery upon compression but did have a moderately low tensile.

Example 3

Four parts of the foam of Example 1 was placed in 100 parts of dimethyl formamide containing 1% by weight of di-N-butyl amine and let stand at 80° C. The foam swelled and became mushy in a few hours and a week later yielded a clear solution.

A film was cast on a glass plate by pouring the clear solution on the plate and then doctor blading to the desired thickness, about 5 to 20 mils. The solvent was allowed to evaporate to give a film suitable for making cut thread. This film after 90 hours in the Ultra-Violet Fadeometer had a light amber color and tensiles of 3700 pounds per square inch and 500% elongation.

Thus, it is possible to make solutions containing from 1 to about 40% by weight or to the saturation level of the polyurethane polycarbonate with the preferred range being about 5 to 30%.

Example 4

The foam (10 parts) of Example 2 was dissolved in 100 parts of dimethyl sulfoxide and then was extruded through a pipette into a water bath to form a continuous filament or thread when dried.

Instead of ethylene glycol and diethylene glycol, other representative glycols such as propylene glycol, butylene glycol and the ether glycols thereof, for instance, triethylene glycol may be used to prepare linear hydroxyl terminated polycarbonate in accordance with well-known procedures and then the polycarbonates can be reacted with an organic polyisocyanate and water to produce foams.

While certain representative embodiments and details have been shown for the purpose of illustrating the invention, it will be apparent to those skilled in this art that various changes and modifications may be made therein without departing from the spirit or scope of the invention.

I claim:

1. A solution of a cured polyurethane polycarbonate in a solvent selected from the class consisting of a dialkyl amide having an alkyl radical containing from about 1 to 10 carbon atoms and dialkyl sulfoxide having an alkyl radical containing from about 1 to 10 carbon atoms, said cured polyurethane polycarbonate being the foamed and cured product of a reaction mixture comprising about one mol of a hydroxyl terminated polycarbonate of about 800 to 5000 molecular weight, 1 to 6 moles of an organic polyisocyanate and a blowing agent.

2. The solution of claim 1 wherein the amount of cured polyurethane polycarbonate present is at least 1% and no more than 40% by weight but does not exceed the saturation level at 20° C.

3. The solution of claim 1 wherein the solvent is a dialkyl amide and contains di-N-butylamine.

4. The solution of claim 1 wherein the solvent is dimethyl formamide.

5. The solution of claim 1 wherein the solvent is dimethyl sulfoxide.

References Cited by the Examiner

UNITED STATES PATENTS 3,036,878   5/1962   Polansky _____ 260—32.6 XR
3,110,686  11/1963   Newton _____ 260—2.5

FOREIGN PATENTS 837,895   6/1960   Great Britain.

OTHER REFERENCES

Saunders et al., "Polyurethanes; Chemistry and Technology, Part II," High Polymer Series, vol. 16, pages 142, 143, 144, 184 and 189, Interscience Pub., N.Y.

LEON J. BERCOVITZ, *Primary Examiner.*

DONALD E. CZAJA, *Examiner.*